US010968302B2

United States Patent
Lee et al.

(10) Patent No.: US 10,968,302 B2
(45) Date of Patent: Apr. 6, 2021

(54) METHOD FOR PREPARING MODIFIED AND CONJUGATED DIENE-BASED POLYMER AND MODIFIED AND CONJUGATED DIENE-BASED POLYMER PREPARED USING THE SAME

(71) Applicant: LG Chem, Ltd., Seoul (KR)

(72) Inventors: Ho Young Lee, Daejeon (KR); No Ma Kim, Daejeon (KR); Sang Mi Lee, Daejeon (KR); Sun Keun Kim, Daejeon (KR)

(73) Assignee: LG Chem, Ltd.

( * ) Notice: Subject to any disclaimer, the term of this patent is extended or adjusted under 35 U.S.C. 154(b) by 228 days.

(21) Appl. No.: 16/077,882

(22) PCT Filed: Jun. 12, 2017

(86) PCT No.: PCT/KR2017/006093
§ 371 (c)(1),
(2) Date: Aug. 14, 2018

(87) PCT Pub. No.: WO2017/217720
PCT Pub. Date: Dec. 21, 2017

(65) Prior Publication Data
US 2019/0048115 A1    Feb. 14, 2019

(30) Foreign Application Priority Data
Jun. 17, 2016   (KR) .................. 10-2016-0076018

(51) Int. Cl.
| | |
|---|---|
| *C08F 236/10* | (2006.01) |
| *C08F 236/06* | (2006.01) |
| *C08K 3/013* | (2018.01) |
| *C08K 5/544* | (2006.01) |
| *C08K 9/06* | (2006.01) |
| *C08C 19/22* | (2006.01) |
| *C08C 19/25* | (2006.01) |
| *C08C 19/44* | (2006.01) |
| *C08F 6/00* | (2006.01) |
| *C08L 15/00* | (2006.01) |
| *B60C 1/00* | (2006.01) |
| *C08F 212/08* | (2006.01) |
| *C08K 3/04* | (2006.01) |
| *C08K 3/36* | (2006.01) |

(52) U.S. Cl.
CPC .............. *C08F 236/10* (2013.01); *B60C 1/00* (2013.01); *C08C 19/22* (2013.01); *C08C 19/25* (2013.01); *C08C 19/44* (2013.01); *C08F 6/003* (2013.01); *C08F 236/06* (2013.01); *C08K 3/013* (2018.01); *C08K 5/544* (2013.01); *C08K 9/06* (2013.01); *C08L 15/00* (2013.01); *C08F 212/08* (2013.01); *C08F 2810/50* (2013.01); *C08K 3/04* (2013.01); *C08K 3/36* (2013.01); *Y02T 10/86* (2013.01)

(58) Field of Classification Search
CPC ...... C08F 236/10; C08F 6/003; C08F 236/06; C08K 3/013; C08K 5/544; C08K 9/06; C08C 19/22; C08C 19/25; C08C 19/44
USPC ........................................................ 524/572
See application file for complete search history.

(56) References Cited

U.S. PATENT DOCUMENTS

| | | | |
|---|---|---|---|
| 4,397,994 | A | 8/1983 | Takeuchi et al. |
| 2011/0015302 | A1 | 1/2011 | Tanaka et al. |
| 2011/0319519 | A1 | 12/2011 | Sone et al. |
| 2014/0155542 | A1 | 6/2014 | Kaszas |
| 2016/0159957 | A1 | 6/2016 | Choi et al. |
| 2016/0177011 | A1 | 6/2016 | Kim et al. |
| 2017/0240732 | A1 | 8/2017 | Takenaka et al. |

FOREIGN PATENT DOCUMENTS

| | | | |
|---|---|---|---|
| CN | 101611077 | A | 12/2009 |
| CN | 102348748 | A | 2/2012 |
| EP | 0934956 | A1 | 8/1999 |
| EP | 2407507 | A1 | 1/2012 |
| EP | 3199572 | A1 | 8/2017 |
| JP | 2005008870 | A | 1/2005 |
| JP | 2008069265 | A | 3/2008 |
| JP | 2010006185 | A | 1/2010 |
| JP | 2013043977 | A | 3/2013 |
| JP | 2013082843 | A | 5/2013 |
| JP | 2013082843 | A * | 5/2013 |
| JP | 2016030795 | A | 3/2016 |
| JP | 2016094557 | A | 5/2016 |
| KR | 20090094139 | A1 | 9/2009 |
| KR | 101489242 | B1 | 2/2015 |
| KR | 20150045990 | A | 4/2015 |
| KR | 20150056484 | A | 5/2015 |
| KR | 20160031712 | A | 3/2016 |
| KR | 20160031712 | A * | 3/2016 |
| WO | 03048216 | A1 | 6/2003 |
| WO | 2016076423 | A1 | 5/2016 |

OTHER PUBLICATIONS

Dorothee I. Fried et al: "Influence of the hydrophilic-hydrophobic contrast of porous surfaces on the enzymatic performance", Journal of Materials Chemistry B, vol. 3, No. 11, Feb. 3, 2015 (Feb. 3, 2015), pp. 2341-2349, XP055589912.

\* cited by examiner

*Primary Examiner* — Kelechi C Egwim
(74) *Attorney, Agent, or Firm* — Lerner, David, Littenberg, Krumholz & Mentlik, LLP

(57) ABSTRACT

The present invention provides a method for preparing a modified and conjugated diene-based polymer, which may prevent processability degradation by restraining the increase of mooney viscosity during post-treatment using steam with high temperature or storage for a long time by stabilizing a modified polymer using a modification stabilizer, and a modified and conjugated diene-based polymer prepared by the preparation method.

8 Claims, No Drawings

METHOD FOR PREPARING MODIFIED AND CONJUGATED DIENE-BASED POLYMER AND MODIFIED AND CONJUGATED DIENE-BASED POLYMER PREPARED USING THE SAME

CROSS-REFERENCE TO RELATED APPLICATIONS

The present application is a national phase entry under 35 U.S.C. § 371 of International Application No. PCT/KR2017/006093 filed Jun. 12, 2017, which claims priority from Korean Patent Application No. 10-2016-0076018 filed Jun. 17, 2016, the disclosures of which are incorporated herein by reference.

TECHNICAL FIELD

The present invention relates to a method for preparing a modified and conjugated diene-based polymer and a modified and conjugated diene-based polymer prepared using the preparation method.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based (co)polymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may also be reduced by appropriately adjusting the glass transition temperature.

The solution-polymerized SBR is prepared by using an anionic polymerization initiator and is being used by coupling or modifying the chain terminals of the polymer thus formed using various modifiers.

For example, U.S. Pat. No. 4,397,994 discloses a method of coupling active anions of the chain terminals of a polymer obtained by polymerizing styrene-butadiene using alkyl-lithium which is a monofunctional initiator in a non-polar solvent, using a binder such as a tin compound.

Meanwhile, carbon black and silica are being used as a reinforcing filler of a tire tread, wherein, if the silica is used as the reinforcing filler, low hysteresis loss and wet skid resistance may be improved. However, since the silica having a hydrophilic surface has a low affinity with a conjugated diene-based rubber in comparison to the carbon black having a hydrophobic surface, dispersibility may be poor, and thus, there is a need to use a separate silane coupling agent to improve the dispersibility or provide coupling between the silica and the rubber.

Therefore, attempt of introducing a functional group having affinity or reactivity with silica into the terminal of a rubber molecule is being performed, but its effect is insufficient.

Accordingly, the development of rubbers having high affinity with a filler such as silica is required.

DISCLOSURE OF THE INVENTION

Technical Problem

The present invention has been devised in consideration of the above-mentioned problems, and an object of the present invention is to provide a method for preparing a modified and conjugated diene-based polymer which may prevent processability degradation by restraining the increase of mooney viscosity during post-treatment using steam with high temperature or storage for a long time by using a modification stabilizer.

Another object of the present invention is to provide a modified and conjugated diene-based polymer prepared by the preparation method.

Further another object of the present invention is to provide a rubber composition including the modified and conjugated diene-based polymer.

Also, further another object of the present invention is to provide a tire manufactured from the rubber composition.

In addition, further another object of the present invention is to provide a modification stabilizer useful for the preparation of the modified and conjugated diene-based polymer.

Technical Solution

To solve the above-described tasks, according to an embodiment of the present invention, there is provided a method for preparing a modified and conjugated diene-based polymer, including polymerizing conjugated diene-based monomers, or a conjugated diene-based monomer and an aromatic vinyl-based monomer in the presence of an organometal compound in a hydrocarbon solvent to prepare a conjugated diene-based polymer of which at least one terminal includes an activated organometal part; reacting the conjugated diene-based polymer with an alkoxysilane-based modifier to prepare a modified and conjugated diene-based polymer of which at least one terminal is combined with a functional group derived from the modifier; adding an alcohol and an antioxidant to the modified and conjugated diene-based polymer to deactivate the activated organometal part remaining in the modified and conjugated diene-based polymer to prepare a modified and conjugated diene-based polymer which is deactivated; and adding a modification stabilizer of the following Formula 1 to the modified and conjugated diene-based polymer which is deactivated, to perform a condensation reaction of the functional group derived from the modifier in the modified and conjugated diene-based polymer and the modification stabilizer of the following Formula 1:

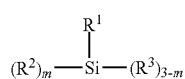

[Formula 1]

in Formula 1, m is an integer of 0 to 3, $R^1$ is a functional group having a structure of the following Formula 1-1, and $R^2$ and $R^3$ are each independently one of a halogen group, an alkyl group of 1 to 5 carbon atoms, and an alkoxy group of 1 to 5 carbon atoms, where at least one of $R^2$ and $R^3$ is the alkoxy group:

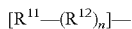

[Formula 1-1]

in Formula 1-1, n is 0 or 1, $R^{11}$ is an amino group or a four-member to six-member heterocyclic group containing 1 to 3 nitrogen atoms, which is unsubstituted or substituted with at least one substituent selected from the group consisting of an alkyl group of 1 to 10 carbon atoms and a cycloalkyl group of 3 to 10 carbon atoms, and $R^{12}$ is an alkylene group of 1 to 10 carbon atoms, which is unsubstituted or substituted with an alkyl group of 1 to 10 carbon atoms.

In addition, according to another embodiment of the present invention, there is provided a modified and conjugated diene-based polymer prepared by the method and including a condensation reaction group of a functional group derived from an alkoxysilane-based modifier and a modification stabilizer of Formula 1 in at least one terminal thereof.

According to further another embodiment of the present invention, there is provided a rubber composition including the modified and conjugated diene-based polymer.

Further, according to further another embodiment of the present invention, there is provided a tire manufactured from the rubber composition.

Also, according to further another embodiment of the present invention, there is provided a modification stabilizer useful for the preparation of the modified and conjugated diene-based polymer.

Advantageous Effects

By the preparation method of a modified and conjugated diene-based polymer according to the present invention, a modified polymer and a modification stabilizer are bonded via condensation for stabilization, and thus, the increase of a mooney viscosity during post-treatment using steam with high temperature or storage for a long time may be restrained, and the degradation of processability may be prevented.

In addition, since a functional group derived from the modification stabilizer in the modified and conjugated diene-based polymer prepared by the preparation method has excellent affinity with a filler, particularly a silica-based filler, the dispersibility of the filler in a rubber composition may be increased, and the processability of the rubber composition may be further improved. As a result, processed goods manufactured using the rubber composition may have excellent tensile strength, abrasion resistance and wet traction.

BEST MODE FOR CARRYING OUT THE INVENTION

Hereinafter, the present invention will be described in more detail in order to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Generally, by using a filler for reinforcing a tire tread, such as silica in a rubber composition including a conjugated diene-based polymer, hysteresis loss of a rubber composition may decrease and wet skid resistance may be improved. However, since silica with a hydrophilic surface has low affinity with hydrophobic conjugated diene-based rubber, there's a problem in dispersing in a rubber composition. In this regard, a method of modifying a filler such as silica, or using a separate silane coupling agent to impart bonding between silica-conjugated diene polymers has been suggested. In addition, a method of improving the dispersibility of the filler in a rubber composition by introducing a functional group using an alkoxysilane-based modifier which has high affinity or reactivity with silica at the terminal of a conjugated diene-based polymer having high mobility, and decreasing hysteresis loss by decreasing the mobility at the terminal of the conjugated diene-based polymer via the bonding with the filler, has been suggested. However, if such a modifier is used, mooney viscosity may increase during post-treatment using steam with high temperature or storage for a long time, thereby degenerating processability.

In this regard, in the present invention, a modified polymer is stabilized via the condensation bonding of a functional group derived from a modifier in a modification completed polymer and a modification stabilizer by using the modification stabilizer after completing modification during preparing the modified and conjugated diene-based polymer. Thus, the increase of mooney viscosity during post-treatment using steam with high temperature or storage for a long time may be restrained and the degeneration of processability may be prevented.

That is, the method for preparing a modified and conjugated diene-based polymer according to an embodiment of the present invention includes a step of polymerizing conjugated diene-based monomers, or a conjugated diene-based monomer and an aromatic vinyl-based monomer in the presence of an organometal compound in a hydrocarbon solvent to prepare a conjugated diene-based polymer of which at least one terminal includes an activated organometal part (step 1); a step of reacting the conjugated diene-based polymer with an alkoxysilane-based modifier to prepare a modified and conjugated diene-based polymer of which at least one terminal is combined with a functional group derived from the modifier (step 2); a step of adding an alcohol and an antioxidant to the modified and conjugated diene-based polymer to deactivate the activated organometal part remaining in the modified and conjugated diene-based polymer to prepare a modified and conjugated diene-based polymer which is deactivated (step 3); and a step of adding a modification stabilizer of the following Formula 1 to the modified and conjugated diene-based polymer which is deactivated, to perform a condensation reaction of the functional group derived from the modifier in the modified and conjugated diene-based polymer and the modification stabilizer of the following Formula 1 (step 4):

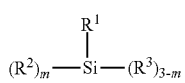

[Formula 1]

in Formula 1, m is an integer of 0 to 3, $R^1$ is a functional group having a structure of the following Formula 1-1, and $R^2$ and $R^3$ are each independently one of a halogen group, an alkyl group of 1 to 5 carbon atoms, and an alkoxy group of 1 to 5 carbon atoms, where at least one of $R^2$ and $R^3$ is the alkoxy group:

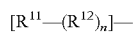

[Formula 1-1]

in Formula 1-1, n is 0 or 1, $R^{11}$ is an amino group or a four-member to six-member heterocyclic group containing 1 to 3 nitrogen atoms, which is unsubstituted or substituted with at least one substituent selected from the group consisting of an alkyl group of 1 to 10 carbon atoms and a cycloalkyl group of 3 to 10 carbon atoms, and $R^{12}$ is an alkylene group of 1 to 10 carbon atoms, which is unsubstituted or substituted with an alkyl group of 1 to 10 carbon atoms.

In Formula 1, $R^1$ is a functional group having a structure of Formula 1-1, and in this case, $R^{11}$ may be selected from the group consisting of an amino group and a five-member or six-member heterocycloalkyl group and heteroaryl group, containing 1 to 3 nitrogen atoms, which is unsubstituted or substituted with at least one substituent selected from the group consisting of an alkyl group of 1 to 6 carbon atoms and a cycloalkyl group of 3 to 6 carbon atoms.

In addition, the heterocycloalkyl group may particularly include a piperidinyl group, a piperazinyl group, a methylpiperazinyl group, a pyrrolidinyl group, an imidazolinyl group, a pyrrolinyl group, a triazolinyl group, etc., and the heteroaryl group may include a pyridinyl group, a pyrazinyl group, a pyrimidinyl group, a pyridazinyl group, a triazinyl group, etc. If $R^{11}$ is the heterocyclic group, it may more particularly be one selected from the group consisting of a piperazinyl group, a methylpiperazinyl group, a pyrimidinyl group, a pyrrolidinyl group, a triazinyl group and an imidazolinyl group. In addition, at least one hydrogen atom in the heterocycloalkyl group or the heteroaryl group may be substituted with an alkyl group of 1 to 6, or 1 to 3 carbon atoms such as a methyl group, an ethyl group, a propyl group, an isopropyl group, an n-butyl group or a t-butyl group.

In addition, $R^{12}$ may be an alkylene group of 1 to 10, more particularly, 4 to 10 carbon atoms, which is unsubstituted or substituted with an alkyl group of 1 to 10, more particularly, 1 to 6, further more particularly, 1 to 4 carbon atoms.

In addition, in Formula 1, $R^2$ and $R^3$ may be each independently an alkoxy group of 1 to 5 carbon atoms such as a methoxy group, an ethoxy group and a t-butoxy group.

More particularly, the modification stabilizer of Formula 1 may be any one selected from the group consisting of the compounds of the following Formulae 1a to 1c, or a mixture of two or more thereof:

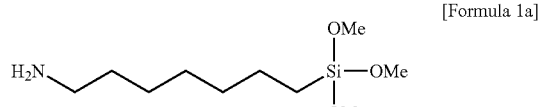

[Formula 1a]

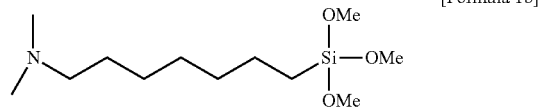

[Formula 1b]

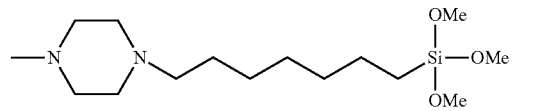

[Formula 1c]

in Formulae 1a to 1c, Me is a methyl group.

Hereinafter, a method for preparing a modified and conjugated diene-based polymer according to an embodiment of the present invention will be explained in detail step by step.

In the method for preparing a modified and conjugated diene-based polymer according to an embodiment of the inventive concept, step 1 is a step for preparing a conjugated diene-based polymer including an activated organometal part in at least one terminal thereof.

In particular, the preparation step of an active polymer may be conducted via the polymerization reaction of a monomer for preparing a conjugated diene-based polymer in the presence of an organometal compound in a hydrocarbon solvent, and as a result of the reaction, a conjugated diene-based polymer including an activated organometal part in at least one terminal thereof is prepared.

In the polymerization of step 1, the monomer for preparing the conjugated diene-based polymer may particularly include a conjugated diene-based monomer, or a mixture of a conjugated diene-based monomer and an aromatic vinyl-based monomer. Accordingly, the polymer prepared by the preparation method according to an embodiment of the present invention may be a homopolymer of a conjugated diene-based monomer, or a copolymer of a conjugated diene-based monomer and an aromatic vinyl-based monomer, and the copolymer may be a random copolymer. Here, the "random copolymer" may represent a state in which structural units constituting the copolymer are arranged in disorder.

The conjugated diene-based monomer is not specifically limited, and may be 1,3-butadiene, 2,3-dimethyl-1,3-butadiene, piperylene, 3-butyl-1,3-octadiene, isoprene or 2-phenyl-1,3-butadiene, and one or a mixture of two or more thereof may be used. In case a finally prepared conjugated diene-based polymer is a copolymer, the conjugated diene-based monomer may be used in an amount such that the repeating unit of the derived structure of the conjugated diene-based monomer is 60 wt % or more, particularly, from 60 wt % to 90 wt %, more particularly, from 60 wt % to 85 wt % based on the total amount of the finally prepared modified and conjugated diene-based polymer.

In addition, the aromatic vinyl-based monomer is not specifically limited and may particularly be styrene, α-methylstyrene, 3-methylstyrene, 4-methylstyrene, 4-propylstyrene, 1-vinylnaphthalene, 4-cyclohexylstyrene, 4-(p-methylphenyl)styrene, or 1-vinyl-5-hexylnaphthalene, and one or a mixture of two or more thereof may be used. The aromatic vinyl-based monomer may be used in an amount such that the repeating unit of the derived structure of the aromatic vinyl-based monomer is 40 wt % or less, particularly, from 10 wt % to 40 wt %, more particularly, from 15 wt % to 40 wt % based on the finally prepared modified and conjugated diene-based polymer.

In addition, in the polymerization of step 1, the hydrocarbon solvent is not specifically limited and may particularly be n-pentane, n-hexane, n-heptane, isooctane, cyclohexane, toluene, benzene or xylene, and one or a mixture of two or more thereof may be used.

In addition, the organometal compound is not specifically limited and may particularly be an organo-alkali metal compound such as methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide, and one or a mixture of two or more thereof may be used. The organometal compound may be used in an amount of 0.01 mmol to 10 mmol based on 100 g of the total amount of the monomer for preparing the modified and conjugated diene-based polymer.

In addition, during the polymerization of step 1, a polar additive may be selectively further added.

The polar additive plays the role of promoting polymerization reaction and increasing polymerization efficiency, particularly, compensating the difference between reaction rates of a conjugated diene-based monomer and an aromatic vinyl-based monomer when copolymerizing them, so as to easily form a random copolymer. The polar additive may particularly be tetrahydrofuran, 2,2-di(2-tetrahydrofuryl)propane, diethyl ether, cycloamyl ether, dipropyl ether, ethylene dimethyl ether, ethylene dimethyl ether, diethyl glycol, dimethyl ether, tert-butoxy ethoxy ethane, bis(3-dimethylaminoethyl) ether, (dimethylaminoethyl) ethyl ether, trimethylamine, triethylamine, tripropylamine, or tetramethylethylenediamine, and one or a mixture of two or more thereof may be used. In addition, the polar additive may be used in an amount of 0.001 parts by weight to 10 parts by weight, more particularly, 0.005 parts by weight to 0.1 parts by weight based on 100 parts by weight of the total amount of the monomers for preparing the conjugated diene polymer.

The polymerization of step 1 may be conducted by an adiabatic polymerization, or a polymerization at a constant temperature.

In this case, the adiabatic polymerization means a polymerization method including a step of polymerizing using self-generated heat of reaction without optionally applying heat after injecting an organometal compound. The polymerization at a constant temperature means a polymerization method by which the temperature of a polymer is kept constant by optionally applying or taking heat away after adding an organometal compound.

Particularly, the polymerization of step 1 may be conducted in a temperature range of −20° C. to 200° C., particularly, 0° C. to 150° C., more particularly, 10° C. to 120° C.

In the preparation method of the modified and conjugated diene-based polymer according to an embodiment of the present invention, step 2 is a step of preparing a modified and conjugated diene-based polymer by conducting a modification reaction of the conjugated diene-based polymer prepared in step 1.

Particularly, step 2 may be conducted by reacting the active polymer with an alkoxysilane-based modifier, and as a result of the modification reaction, the modifier and an activated organometal part react, and a modified and conjugated diene-based polymer in which a functional group derived from a modifier, particularly, an alkoxysilyl group is combined in at least one terminal thereof is prepared.

During the modification of step 2, one compound of the following Formula 2 or Formula 3, or a mixture of two or more thereof may be used as the modifier:

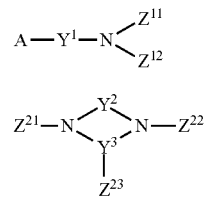

[Formula 2]

[Formula 3]

In Formula 2 and formula 3,

A is selected from the group consisting of a $C_{1-20}$alkyl group, a $(C_{1-20}$alkyl)silyl group, an $(C_{1-20}$alkoxy)silyl group, an amino group, a $(C_{1-20}$alkyl)amino group, and a heterocyclic group containing at least one nitrogen atom, which is unsubstituted or substituted with at least one substituent selected from the group consisting of an alkyl group of 1 to 6 carbon atoms and a cycloalkyl group of 3 to 6 carbon atoms, $Y^1$ to $Y^3$ are each independently a divalent hydrocarbon group of 1 to 20 carbon atoms, $Z^{11}$, $Z^{12}$, and $Z^{21}$ to $Z^{23}$ are each independently a monovalent hydrocarbon group of 1 to 20 carbon atoms, which is unsubstituted or substituted with an organic group containing Si, O, or N, and which does not include active hydrogen, where at least one of $Z^{11}$ and $Z^{12}$, and at least one of $Z^{21}$ to $Z^{23}$ are functional groups of the following Formula 4:

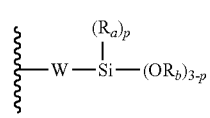

[Formula 4]

in Formula 4, p is an integer of 0 to 2, $R_a$ and $R_b$ are each independently a monovalent hydrocarbon group of 1 to 10 carbon atoms, and W is a divalent hydrocarbon group of 1 to 10 carbon atoms, which is unsubstituted or substituted with an alkyl group of 1 to 4 carbon atoms.

Meanwhile, the active hydrogen in the present invention is hydrogen in an atomic state with high reactivity, and means a hydrogen atom bonded to O or N, which has high electronegativity in OH, NH$_2$, etc.

Particularly, in Formula 2, A may be selected from the group consisting of an alkyl group of 1 to 10 carbon atoms, a (C$_{1-6}$alkyl)silyl group, a (C$_{1-6}$alkoxy)silyl group, an amino group, a (C$_{1-6}$alkyl)amino group, and a five-member to six-member heterocycloalkyl group or heteroaryl group containing 1 to 3 nitrogen atoms.

In addition, the heterocycloalkyl group may particularly be a piperidinyl group, a piperazinyl group, a methylpiperazinyl group, a pyrrolidinyl group, an imidazolinyl group, a pyrrolinyl group, a triazolinyl group, etc., and the heteroaryl group may be a pyridinyl group, a pyrazinyl group, a pyrimidinyl group, a pyridazinyl group, a triazinyl group, etc. In case A is the heterocyclic group, one selected from the group consisting of a piperazinyl group, a triazinyl group and an imidazolinyl group may particularly be used. In addition, at least one hydrogen atom in the heterocycloalkyl group or the heteroaryl group may be substituted with an alkyl group of 1 to 6, or 1 to 3 carbon atoms such as a methyl group, an ethyl group, a propyl group, an isopropyl group, an n-butyl group or a t-butyl group.

In addition, in Formula 2, Y$^1$ may particularly be selected from the group consisting of a substituted or unsubstituted alkylene group of 1 to 20 carbon atoms, an arylene group of 6 to 20 carbon atoms, and a combination group thereof. If Y$^1$ is the combination group, particularly, -[(M)$_{q1}$-(N)$_{q2}$]— (in this case, M and N are each independently a substituted or unsubstituted alkylene group of 1 to 20 carbon atoms or an arylene group of 6 to 20 carbon atoms, where M and N are not the same, and q1 and q2 are each independently an integer of 1 to 3) may be included. More particularly, Y$^1$ may be an alkylene group of 1 to 10 carbon atoms, more particularly, an alkylene group of 1 to 6 carbon atoms such as a methylene group, an ethylene group and a propylene group, and may particularly be a methylene group, an ethylene group or a propylene group among them. Also, Y$^1$ may be substituted with at least one functional group among an alkyl group of 1 to 6 carbon atoms and a cycloalkyl group of 3 to 6 carbon atoms, and more particularly, may be substituted with an alkyl group of 1 to 4 carbon atoms.

In addition, in Formula 2, Z$^{11}$ and Z$^{12}$ may be each independently selected from the group consisting of an alkyl group of 1 to 10 carbon atoms, a (C$_{1-10}$alkyl)amino group and the functional group of Formula 4, and at least one of Z$^{11}$ and Z$^{12}$ may be the functional group of Formula 4.

In addition, in Formula 3, Y$^2$ and Y$^3$ may be each independently a substituted or unsubstituted alkylene group of 1 to 20 carbon atoms, more particularly, an alkylene group of 1 to 10 carbon atoms, further more particularly, an alkylene group of 1 to 6 carbon atoms such as a methylene group, an ethylene group and a propylene group, and specifically, a methylene group, an ethylene group, or a propylene group may be used. In addition, Y$^2$ and Y$^3$ may be each independently substituted with at least one functional group among an alkyl group of 1 to 6 carbon atoms and a cycloalkyl group of 3 to 6 carbon atoms, more particularly, may be substituted with an alkyl group of 1 to 4 carbon atoms.

In addition, in Formula 3, Z$^{21}$ to Z$^{23}$ may be each independently selected from the group consisting of an alkyl group of 1 to 10 carbon atoms, a (C$_{1-10}$alkyl)amino group and the functional group of Formula 4, and at least one of Z$^{21}$ to Z$^{23}$ may be the functional group of Formula 4.

Particular examples of the modifier may include vinylchlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyldiethoxysilane, 3-glycidoxypropyltriethoxysilane, p-styryltrimethoxysilane, 3-methacryloxypropyltriethoxysilane, 3-methacryloxypropyltrimethoxysilane, 3-methacryloxypropyldimethoxysilane, 3-methacryloxyporpylmethyldiethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptoprpylmethyldimethoxysilane, 3-mercaptopropyltrimethoxysilane, bis(triethoxysilylpropyl)tetrasulfide, 3-isocyanatopropyltriethoxysilane, or the like, and one selected therefrom or a mixture of two of more thereof may be used.

More particularly, the modifier has high anion reactivity and may easily act with the active part of a polymer, to conduct modification easily, and thus, may include one selected from the group consisting of the following Formula 5a to Formula 5h, or a mixture of two or more thereof.

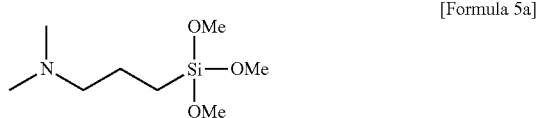

[Formula 5a]

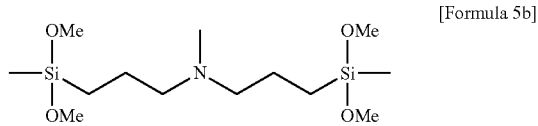

[Formula 5b]

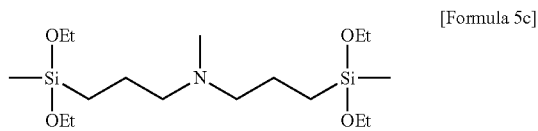

[Formula 5c]

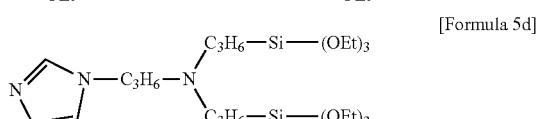

[Formula 5d]

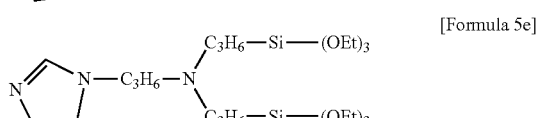

[Formula 5e]

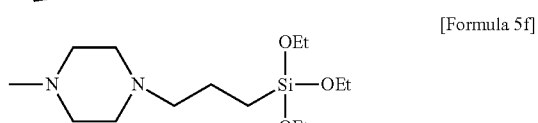

[Formula 5f]

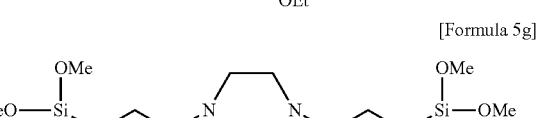

[Formula 5g]

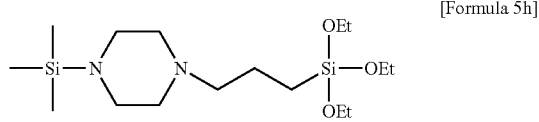
[Formula 5h]

In Formulae 5a to 5h, Me is a methyl group and Et is an ethyl group.

The modifier may be used in a molar ratio of 0.1 to 2 relative to 1 mol of the organometal compound in step 1.

In addition, the modification reaction of step 2 may be conducted in a temperature range of 10° C. to 120° C. for 10 minutes to 5 hours.

Then, step 3 of the preparation method of a modified and conjugated diene-based polymer according to an embodiment of the present invention is a deactivation step with respect to an activated organometal part remaining in the modified and conjugated diene-based polymer.

The deactivation is for preventing the action of a modification stabilizer as a modifier, which is injected in a subsequent reaction, by the reaction with an active terminal which is not reacted in the modification step of step 2 and remains. If a deactivation process is not conducted, sufficient stabilization effect is hard to attain due to the side reactions of the modification stabilizer and the remaining active part during the reaction with the modification stabilizer. The deactivation may be conducted by injecting an alcohol and an antioxidant to the modified polymer obtained in step 3 and reacting.

The alcohol may include an alcohol of 1 to 10 carbon atoms such as ethanol and isopropanol, and one or a mixture of two or more thereof may be used.

The alcohol may be used in an amount of 0.0001 parts by weight to 1 part by weight based on 100 parts by weight of the injection amount of the monomers used for the preparation of the modified and conjugated diene-based polymer. If the amount used of the alcohol is less than 0.0001 parts by weight, a sufficient deactivation effect may be difficult to obtain. More particularly, the alcohol may be used in an amount of 0.01 parts by weight to 0.1 parts by weight, more particularly, 0.03 parts by weight to 0.05 parts by weight.

In addition, the antioxidant may include 4-hydroxy-2,2, 6,6-tetramethyl-piperidine-1-oxyl, triethylene glycol-bis-3-(3-t-butyl-4-hydroxy-5-methylphenyl)propionate, or butylated hydroxytoluene (BHT), and one or a mixture of two or more thereof may be used. In addition, the antioxidant may be used in an amount of 0.0001 to 1 part by weight based on 100 parts by weight of the injection amount of the monomers used for the preparation of the modified and conjugated diene-based polymer. If the amount used of the antioxidant is less than 0.0001 parts by weight, a sufficient deactivation effect is difficult to obtain, and if the amount is greater than 1 part by weight, it is apprehended that side reactions may be accompanied due to the excessive amount used of the antioxidant. More particularly, from 0.01 parts by weight to 0.1 parts by weight, further more particularly, from 0.03 parts by weight to 0.05 parts by weight may be used.

After that, step 4 in the preparation method of the modified and conjugated diene-based polymer according to an embodiment of the present invention is the stabilization step of a modified polymer.

The stabilization step of the modified polymer may be conducted via the condensation reaction of the deactivation treated modified polymer in step 3 with a modification stabilizer of the following Formula 1. As a result of such a reaction, a modified and conjugated diene-based polymer is obtained by the condensation reaction of the modification stabilizer of the following Formula 1 with respect to an alkoxysilyl group derived from a modifier in the modified polymer:

[Formula 1]

In Formula 1, m, and $R^1$ to $R^3$ are the same as defined above.

The modification stabilizer available during the condensation reaction in step 4 is the same as explained above, and may be used in an amount of 0.01 wt % to 1 wt % based on the total amount of the modification polymer.

Conventionally, the condensation reaction of a modified and conjugated diene-based polymer was conducted in the presence of a condensation promoter including tin (Sn), titanium (Ti), zirconium (Zr), bismuth (Bi) or aluminum (Al), particularly, a condensation promoter such as tin dicarboxylate, dihydrocarbyl tin dicarboxylate, titanium tetraalkoxide and titanium dialkoxy bis(α,γ-diketonate), in order to introducing an excessive equivalent of an alkoxysilane compound residue into the terminal of the polymer in the modified and conjugated diene-based polymer. However, in this case, metal elements included in the condensation promoter act as a catalyst, and side reactions promoting the reaction between alkoxy groups present in a modified polymer are generated. Regarding this, the condensation reaction of the alkoxy group present in the modified polymer with the modification stabilizer is induced by using the modification stabilizer of the above-described organic compounds in the present invention, thereby largely improving the stability of the polymer thus prepared.

In addition, the condensation reaction may be conducted in a temperature range of 10° C. to 80° C. while sufficiently stirring for 10 minutes to 5 hours.

The preparation method according to an embodiment of the present invention may selectively further include a steam stripping process after step 4.

The steam stripping process is a process for desolventization, and the steam stripping may be conducted by immersing the polymer obtained by the condensation reaction of the functional group derived from the modifier in the modified polymer with the modification stabilizer of Formula 1 in step 4, into water heated to 70° C. to 100° C. using steam.

After conducting the steam stripping process, one or more processes among recovering solvents and unreacted monomers, and drying may be selectively further conducted, as needed.

The processes of recovering solvents and unreacted monomers and drying may be conducted by a conventional method.

The modified and conjugated diene-based polymer according to an embodiment of the present invention, which is prepared via the reaction of the active terminal with the alkoxysilane-based modifier, the subsequent reaction of transforming the active terminal into an inactive terminal in a modified polymer, and the condensation reaction of an alkoxy group derived from the modifier introduced in the modified polymer with an alkoxy group in the modification stabilizer as described above, has further improved stability due to the functional group derived from the modification stabilizer which is bonded via condensation to a modification terminal part, when compared to the conventional modification polymer obtained via a primary reaction of an active terminal with an alkoxysilane-based modifier. As a result, the increase of mooney viscosity during post-treatment using steam with high temperature or during storage for a long time may be restrained, thereby preventing the degeneration of processability.

In addition, the functional group derived from the modification stabilizer in the modified and conjugated diene-based polymer includes a functional group having affinity with a filler, particularly a silica-based filler, and the dispersibility of the filler in a rubber composition may be increased, and the processability of the rubber composition may be further improved. As a result, processed goods manufactured using the rubber composition may have excellent tensile strength, abrasion resistance and wet traction.

According to another embodiment of the present invention, there is provided a modified and conjugated diene-based polymer prepared by the preparation method.

Particularly, the modified and conjugated diene-based polymer may include a condensation reaction group formed via the condensation reaction of a functional group derived from a modifier positioned in at least one terminal thereof, particularly, an alkoxysilyl group, with a modification stabilizer of the following Formula 1:

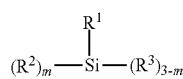

[Formula 1]

In Formula 1, m, and $R^1$ to $R^3$ are the same as defined above.

The modified and conjugated diene-based polymer may be a homopolymer of a conjugated diene-based monomer, or a modified material of a copolymer of a conjugated diene-based monomer and an aromatic vinyl-based monomer.

In addition, the modified and conjugated diene-based polymer may have molecular weight distribution (PDI, Mw/Mn) of 1.0 to 3.0, more particularly, 1.0 to 1.2. If the molecular weight distribution is greater than 3.0, it is apprehended that abrasion resistance may be degraded. In the present invention, the molecular weight distribution of the modified and conjugated diene-based polymer may be calculated from a ratio (Mw/Mn) of a weight average molecular weight (Mw) to a number average molecular weight (Mn). In this case, the number average molecular weight (Mn) is a common average of an individual polymer molecular weight, which is obtained by measuring the molecular weights of n polymer molecules, obtaining the total of the molecular weights and dividing the total by n. The weight average molecular weight (Mw) illustrates the molecular weight distribution of a polymer composition. All molecular weight average values may be expressed by gram per mol (g/mol).

In addition, in the present invention, each of the weight average molecular weight and the number average molecular weight is a polystyrene converted molecular weight analyzed by gel permeation chromatography (GPC).

In addition, the modified and conjugated diene-based polymer may have mooney viscosity (ML1+4, 100° C.) of 10 to 150, more particularly, 30 to 120, further more particularly, 60 to 90. If the mooney viscosity of the modified and conjugated diene-based polymer is less than 10, it is apprehended that the mechanical properties of a rubber composition including tensile strength may be degraded, and if the mooney viscosity is greater than 150, processability may be degraded and mulling with mixing components may become difficult.

In addition, the modified and conjugated diene-based polymer may have a vinyl content of 5 wt % or more, particularly, 10 wt % or more, more particularly, 10 wt % to 50 wt %. When the vinyl content is in the range, a glass transition temperature may be controlled in an appropriate range, and accordingly, when the modified and conjugated diene-based polymer is applied to tires, physical properties required for tires such as running resistance and braking force may be improved, and effect of decreasing a fuel consumption ratio may be attained.

In this case, the vinyl content represents the amount of not 1,4-added but 1,2-added conjugated diene-based monomer based on 100 wt % of the conjugated diene-based polymer composed of a vinyl group-containing monomer or a conjugated diene-based monomer.

Further, according to another embodiment of the present invention, there is provided a rubber composition including the modified and conjugated diene-based polymer.

The rubber composition may include the modified and conjugated diene-based polymer in an amount of 10 wt % or more, particularly, 10 wt % to 100 wt %, more particularly 20 wt % to 90 wt %. If the amount of the modified and conjugated diene-based polymer is less than 10 wt %, improving effects of abrasion resistance and crack resistance of a molded article, for example, a tire, which is manufactured by using the rubber composition may be consequently insignificant.

In addition, the rubber composition may further include other rubber components, if necessary, in addition to the modified and conjugated diene-based polymer, and, in this case, the rubber component may be included in an amount of 90 wt % or less based on the total amount of the rubber composition. Particularly, the rubber component may be included in an amount of 1 part by weight to 900 parts by weight based on 100 parts by weight of the modified and conjugated diene-based copolymer.

The rubber component may be a natural rubber or a synthetic rubber, and the rubber component may be, for example, a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture of two or more thereof may be used.

In addition, the rubber composition may include 0.1 parts by weight to 200 parts by weight of a filler based on 100 parts by weight of the modified and conjugated diene-based polymer. The filler may particularly be a silica-based filler or a carbon black-based filler, or a combination thereof.

In addition, if a silica-based filler is used as the filler, a silane coupling agent may be used together for the improvement of reinforcing and low exothermic properties.

The silane coupling agent may particularly include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, in the rubber composition according to an embodiment of the present invention, a modified and conjugated diene-based polymer in which a functional group having high affinity with a silica-based filler is introduced into an active part is used as a rubber component, and the mixing amount of a silane coupling agent may be smaller than a common case. In particular, the silane coupling agent may be used in an amount of 1 part by weight to 20 parts by weight based on 100 parts by weight of the silica-based filler. Within the above range, effects as a coupling agent may be sufficiently exhibited, and the gelation of a rubber component may be prevented. More particularly, the silane coupling agent may be used in an amount of 5 parts by weight to 15 parts by weight based on 100 parts by weight of the silica-based filler.

In addition, the rubber composition according to an embodiment of the present invention may be sulfur cross-linkable, and so may further include a vulcanizing agent.

The vulcanizing agent may particularly be a sulfur powder and may be included in an amount of 0.1 parts by weight to 10 parts by weight based on 100 parts by weight of a rubber component. With the amount in the above range, elasticity and strength required for a vulcanized rubber composition may be secured, and at the same time, a low fuel consumption ratio may be attained.

In addition, the rubber composition according to an embodiment of the present invention may further include various additives used in a common rubber industry in addition to the above-described components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator is not specifically limited and may particularly include thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG). The vulcanization accelerator may be included in an amount of 0.1 parts by weight to 5 parts by weight based on 100 parts by weight of the rubber components.

In addition, the process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and properties at low temperature. The process oil may be included in an amount of 100 parts by weight or less based on 100 parts by weight of the rubber components. With the above-described amount, the deterioration of tensile strength and low exothermic properties (low fuel consumption ratio) of the vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at high temperature. The antiaging agent may be used in an amount of 0.1 parts by weight to 6 parts by weight based on 100 parts by weight of the rubber components.

The rubber composition according to an embodiment of the present invention may be obtained by mulling using a mulling apparatus such as a banbury mixer, a roll, and an internal mixer according to a mixing prescription. In addition, a rubber composition having low exothermic properties and good abrasion resistance may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a dustproof rubber, a belt conveyor, and a hose.

Also, according to another embodiment of the present invention, there is provided a molded article and a tire manufactured using the rubber composition.

The tire may be a tire or include a tire tread.

Further, according to another embodiment of the present invention, there is provided a modification stabilizer including a compound of the following Formula 1, which is useful for preparing the modified and conjugated diene-based polymer.

[Formula 1]

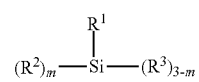

In Formula 1, m, and $R^1$ to $R^3$ are the same as defined above.

Hereinafter, the present invention will be explained in more detail referring to embodiments and experimental embodiments. However, the following embodiments and experimental embodiments are only for the illustration of the present invention, and the scope of the present invention is not limited thereto.

Example 1

To a 20 L autoclave reactor, 270 g of styrene, 710 g of 1,3-butadiene, 5,000 g of n-hexane, and 1.3 g of 2,2-di(2-tetrahydrofuryl)propane as a polar additive were added, and the internal temperature of the reactor was controlled to 40° C. When the internal temperature of the reactor reached 40° C., 4 mmol of n-butyllithium was injected into the reactor, and an adiabatic reaction with heating was performed. After about 20 minutes from the initiation of a polymerization reaction, 20 g of 1,3-butadiene was injected for capping the terminal of a polymerized styrene-butadiene polymer with butadiene. After 5 minutes, 4 mmol of a compound of Formula 5a below was injected as a modifier, and reaction was conducted for 15 minutes. Then, the polymerization reaction was quenched by adding 0.03 parts by weight of ethanol based on monomers, and 5 ml of a hexane solution in which 0.3 wt % of butylated hydroxytoluene (BHT) as an antioxidant was dissolved (0.03 parts by weight was added based on the monomers), was added thereto.

To the modified polymer thus obtained, a compound of Formula 1a below was added as a modification stabilizer, and a condensation reaction was conducted for 15 minutes. Then, a polymer was injected into hot water of 100° C. heated using steam and stirred to remove solvents, followed by roll drying to remove remaining solvents and water to prepare a modified styrene-butadiene copolymer.

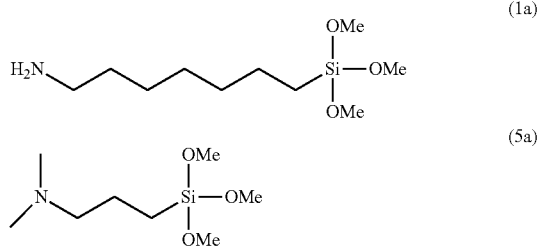

Example 2

A modified styrene-butadiene copolymer was prepared by conducting the same method as in Example 1 except for using a compound of Formula 1b below as a modification stabilizer.

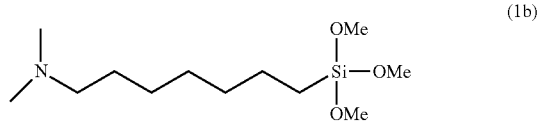 [SMILES: CO[Si](CCCCCCCN(C)C)(OC)OC]

Example 3

A modified styrene-butadiene copolymer was prepared by conducting the same method as in Example 1 except for using a compound of Formula 1c below as a modification stabilizer.

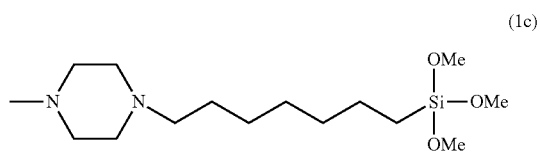 [SMILES: CO[Si](CCCCCCCN1CCN(C)CC1)(OC)OC]

Comparative Example 1

A modified styrene-butadiene copolymer was prepared by conducting the same method as in Example 1 except for not conducting the condensation reaction with a modification stabilizer in Example 1.

In detail, to a 20 L autoclave reactor, 270 g of styrene, 710 g of 1,3-butadiene, 5,000 g of n-hexane, and 1.3 g of 2,2-di(2-oxolanyl)propane as a polar additive were added, and the internal temperature of the reactor was controlled to 40° C. When the internal temperature of the reactor reached 40° C., 4 mmol of n-butyllithium was injected into the reactor, and an adiabatic reaction with heating was performed. After about 20 minutes from the reaction, 20 g of 1,3-butadiene was injected for capping the terminal of SSBR with butadiene. After 5 minutes, 4 mmol of dimethylaminomethoxysilane was injected as a modifier, and the reaction was conducted for 15 minutes. Then, the polymerization reaction was quenched using ethanol, and 5 ml of a hexane solution in which 0.3 wt % of butylated hydroxytoluene (BHT) as an antioxidant was dissolved, was added thereto. The polymer thus obtained was injected into hot water of 100° C. heated with steam, stirred to remove solvents, and roll dried to remove remaining solvents and water to prepare a modified styrene-butadiene copolymer.

Experimental Example 1

A weight average molecular weight (Mw), a number average molecular weight (Mn), polydispersity index (PDI), styrene derived structural unit and vinyl contents, and mooney viscosity (MV) were measured for each of the modified styrene-butadiene copolymers prepared in the examples and the comparative example. The results are shown in Table 1 below.

1) Analysis of Styrene Derived Structural Unit and Vinyl Contents

The styrene derived structural unit (SM) and vinyl contents in each copolymer were measured using nuclear magnetic resonance (NMR).

2) Analysis of Molecular Weights

The weight average molecular weight (Mw) and the number average molecular weight (Mn) of each copolymer were measured by gel permeation chromatography (GPC) analysis in conditions of 40° C. In this case, two columns of PLgel Olexis and one column of PLgel mixed-C of Polymer Laboratories Co. Ltd. were used in combination, and newly replaced columns were all mixed bed type columns. In addition, polystyrene (PS) was used as a GPC standard material for calculating the molecular weights. Polydispersity index (PDI) was calculated from the ratio (Mw/Mn) of the weight average molecular weight and the number average molecular weight measured by the above method.

3) Analysis of Mooney Viscosity

The mooney viscosity of each copolymer was measured by using MV-2000 (Alpha Technologies Co., Ltd.) at 100° C. for 4 minutes after pre-heating two specimens, of which amount was 15 g or more each, for 1 minute.

TABLE 1

| | Example 1 | Example 2 | Example 3 | Comparative Example 1 |
|---|---|---|---|---|
| Mooney viscosity (MV) | 67 | 69 | 73 | 97 |
| NMR Styrene content (wt % based on total polymer amount) | 27.0 | 26.8 | 26.9 | 27.1 |
| NMR Vinyl content (wt % based on total polymer amount) | 42.9 | 43.1 | 42.8 | 42.9 |

TABLE 1-continued

| | | Example 1 | Example 2 | Example 3 | Comparative Example 1 |
|---|---|---|---|---|---|
| GPC | Mn (×10⁴ g/mol) | 12.6 | 13.2 | 13.0 | 16.9 |
| GPC | Mw (×10⁴ g/mol) | 13.6 | 14.8 | 15.1 | 20.4 |
| GPC | PDI (Mw/Mn) | 1.08 | 1.12 | 1.16 | 1.21 |

Referring to the experimental results, the modified styrene-butadiene copolymers of Examples 1 to 3, which were prepared using a modification stabilizer, showed almost equivalent level of styrene and vinyl group contents in polymers, but lower Mn, Mw and PDI and remarkably decreased value regarding mooney viscosity (MW), when compared to the modified styrene butadiene copolymer of Comparative Example 1, which was prepared without a modification stabilizer.

Experimental Example 2

In order to comparatively analyze the physical properties of rubber compositions including each copolymer of the examples and comparative example and molded articles manufactured therefrom, tensile properties and viscoelasticity properties were measured.

1) Preparation of Rubber Composition

Each rubber composition was prepared via a first stage mulling, a second stage mulling and a third stage mulling. In this case, the amounts used of materials excluding a modified styrene-butadiene copolymer were shown based on 100 parts by weight of the modified styrene-butadiene copolymer. In the first stage mulling, 100 parts by weight of each copolymer, 70 parts by weight of silica, 11.02 parts by weight of bis(3-triethoxysilylpropyl)tetrasulfide as a silane coupling agent, 33.75 parts by weight of a process oil (TDAE), 2.0 parts by weight of an antiaging agent (TMDQ), 2.0 parts by weight of an antioxidant, 3.0 parts by weight of zinc oxide (ZnO), 2.0 parts by weight of stearic acid, and 1.0 part by weight of wax were mixed and mulled under conditions of 80 rpm by using a banbury mixer equipped with a temperature controlling apparatus. In this case, the temperature of the mulling apparatus was controlled, and a first compound mixture was obtained at a discharge temperature of 140° C. to 150° C. In the second stage mulling, the first compound mixture was cooled to room temperature, and 1.75 parts by weight of a rubber accelerator (CZ), 1.5 parts by weight of a sulfur powder, and 2.0 parts by weight of a vulcanization accelerator were added to the mulling apparatus and mixed at a temperature of 60° C. or less to obtain a second compound mixture. Then, the second compound mixture was molded at the third stage mulling, and vulcanized at 180° C. for t90+10 minutes using a vulcanization press to prepare each vulcanized rubber.

2) Tensile Properties

The tensile properties were measured by manufacturing each specimen (thickness of 25 mm, length of 80 mm) and measuring tensile strength when broken and tensile stress when elongated by 300% (300% modulus) of each specimen according to an ASTM 412 tensile test method. Particularly, a Universal Test machine 4204 tensile tester (Instron Co., Ltd.) was used, and measurement of tensile properties was performed at room temperature at a rate of 50 cm/min, to obtain a tensile strength value and a tensile stress value when elongated by 300%.

3) Viscoelasticity Properties

The viscoelasticity properties were measured by using a dynamic mechanical analyzer (TA Co., Ltd.). Tan δ was measured by changing deformation at each measurement temperature (0° C. to 60° C.) with a twist mode and a frequency of 10 Hz. Payne effect (ΔG') was shown as the difference between a minimum value and a maximum value at deformation of 0.28% to 40%, and if the Payne effect decreases, it means that dispersibility of a filler is excellent. In addition, if the tan δ at a high temperature of 60° C. is low, it means that hysteresis loss is small, and low rolling resistance (fuel consumption ratio) is excellent.

TABLE 2

| | Example 1 | Example 2 | Example 3 | Comparative Example 1 |
|---|---|---|---|---|
| 300% modulus (Kgf/cm²) | 151 | 148 | 147 | 134 |
| Tensile strength (Kgf/cm²) | 221 | 216 | 219 | 203 |
| ΔG' | 0.52 | 0.52 | 0.66 | 0.92 |
| tan δ @ 0° C. | 1.012 | 1.061 | 1.058 | 1.012 |
| tan δ @ 60° C. | 0.081 | 0.080 | 0.084 | 0.102 |

Referring to the experimental results, the rubber composition including one of the modified styrene-butadiene copolymers of Examples 1 to 3, which were prepared by the preparation method according to the present invention, was excellent in terms of all the properties including tensile strength, viscoelasticity and processability when compared to those of Comparative Example 1.

The invention claimed is:

1. A method for preparing a modified and conjugated diene-based polymer, the method comprising:
   polymerizing conjugated diene-based monomers, or a conjugated diene-based monomer and an aromatic vinyl-based monomer in the presence of an organometal compound in a hydrocarbon solvent to prepare a conjugated diene-based polymer of which at least one terminal comprises an activated organometal part;
   reacting the conjugated diene-based polymer with an alkoxysilane-based modifier to prepare a modified and conjugated diene-based polymer of which at least one terminal is combined with a functional group derived from the modifier;
   adding an alcohol and an antioxidant to the modified and conjugated diene-based polymer to deactivate the activated organometal part remaining in the modified and conjugated diene-based polymer to prepare a modified and conjugated diene-based polymer which is deactivated; and
   adding a modification stabilizer of the following Formula 1 to the modified and conjugated diene-based polymer which is deactivated, to perform a condensation reaction of the functional group derived from a modifier in the modified and conjugated diene-based polymer and the modification stabilizer of the following Formula 1:

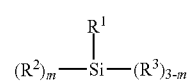

[Formula 1]

in Formula 1, m is an integer of 0 to 3, $R^1$ is a functional group having a structure of the following Formula 1-1, and $R^2$ and $R^3$ are each independently one of a halogen group, an alkyl group of 1 to 5 carbon atoms, or an alkoxy group of 1 to 5 carbon atoms, where at least one of $R^2$ and $R^3$ is the alkoxy group, $$[R^{11}-(R^{12})_n]- \qquad \text{[Formula 1-1]}$$

in Formula 1-1, n is 0 or 1, $R^{11}$ is an amino group or a four-member to six-member heterocyclic group containing 1 to 3 nitrogen atoms, which is unsubstituted or substituted with at least one substituent selected from the group consisting of an alkyl group of 1 to 10 carbon atoms and a cycloalkyl group of 3 to 10 carbon atoms, and $R^{12}$ is an alkylene group of 1 to 10 carbon atoms, which is unsubstituted or substituted with an alkyl group of 1 to 10 carbon atoms.

2. The method for preparing a modified and conjugated diene-based polymer of claim 1, wherein $R^1$ is a functional group having a structure of Formula 1-1, where $R^{11}$ is selected from the group consisting of an amino group, an imidazolinyl group, a piperazinyl group, a methyl piperazinyl group, a pyrimidinyl group, a pyrrolidinyl group and a triazinyl group, which is unsubstituted or substituted with at least one substituent selected from the group consisting of an alkyl group of 1 to 6 carbon atoms and a cycloalkyl group of 3 to 6 carbon atoms, and $R^{12}$ is an alkylene group of 4 to 10 carbon atoms, which is unsubstituted or substituted with an alkyl group of 1 to 4 carbon atoms, and $R^2$ and $R^3$ are each independently an alkoxy group of 1 to 5 carbon atoms.

3. The method for preparing a modified and conjugated diene-based polymer of claim 1, wherein the modification stabilizer of Formula 1 is selected from the group consisting of compounds of the following Formulae 1a to 1c:

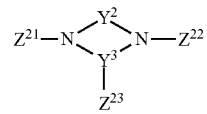
[Formula 1a]

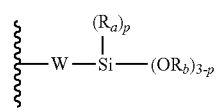
[Formula 1b]

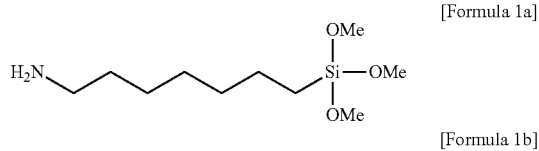
[Formula 1c]

in Formulae 1a to 1c, Me is a methyl group.

4. The method for preparing a modified and conjugated diene-based polymer of claim 1, wherein the modifier is a compound of the following Formula 2 or Formula 3:

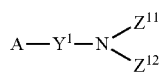
[Formula 2]

$$Z^{21}-N\begin{array}{c}Y^2\\Y^3\end{array}N-Z^{22}$$
$$\phantom{Z^{21}-N}|\phantom{Y^3N-Z^{22}}$$
$$\phantom{Z^{21}-N}Z^{23}$$
[Formula 3]

in Formula 2 and formula 3,

A is selected from the group consisting of a $C_{1-20}$alkyl group, a $(C_{1-20}$alkyl)silyl group, a $(C_{1-20}$alkoxy)silyl group, an amino group, a $(C_{1-20}$alkyl)amino group, and a heterocyclic group containing at least one nitrogen atom, which is unsubstituted or substituted with at least one substituent selected from the group consisting of an alkyl group of 1 to 6 carbon atoms and a cycloalkyl group of 3 to 6 carbon atoms, $Y^1$ to $Y^3$ are each independently a divalent hydrocarbon group of 1 to 20 carbon atoms, $Z^{11}$, $Z^{12}$, and $Z^{21}$ to $Z^{23}$ are each independently a monovalent hydrocarbon group of 1 to 20 carbon atoms, which is unsubstituted or substituted with an organic group containing Si, O, or N, and which does not include active hydrogen, where at least one of $Z^{11}$ and $Z^{12}$, and at least one of $Z^{21}$ to $Z^{23}$ are functional groups of the following Formula 4:

$$\xi-W-\underset{\underset{(OR_b)_{3-p}}{|}}{\overset{\overset{(R_a)_p}{|}}{Si}}$$
[Formula 4]

in Formula 4, p is an integer of 0 to 2, $R_a$ and $R_b$ are each independently a monovalent hydrocarbon group of 1 to 10 carbon atoms, and W is a divalent hydrocarbon group of 1 to 10 carbon atoms, which is unsubstituted or substituted with an alkyl group of 1 to 4 carbon atoms.

5. The method for preparing a modified and conjugated diene-based polymer of claim 4, wherein the heterocyclic group containing at least one nitrogen atom is selected from the group consisting of a piperazinyl group, a triazinyl group and an imidazolinyl group.

6. The method for preparing a modified and conjugated diene-based polymer of claim 1, wherein the modifier is selected from the group consisting of the following Formula 5a to Formula 5h:

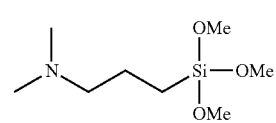
[Formula 5a]

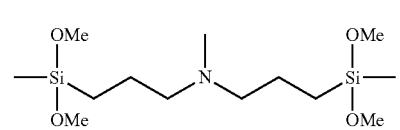
[Formula 5b]

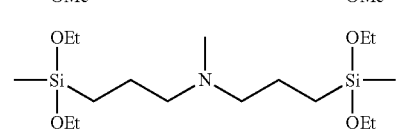
[Formula 5c]

[Formula 5d]

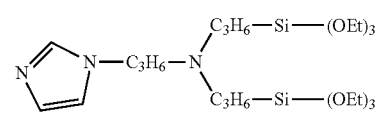

[Formula 5e]

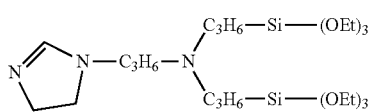

[Formula 5f]

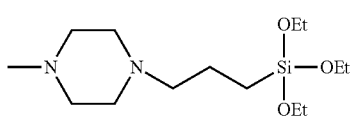

[Formula 5g]

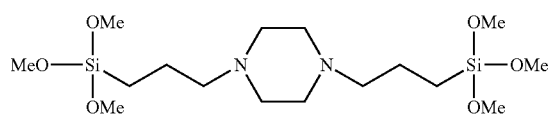

[Formula 5h]

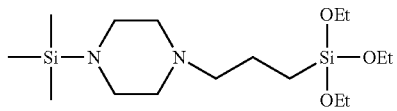

in Formulae 5a to 5h, Me is a methyl group and Et is an ethyl group.

7. The method for preparing a modified and conjugated diene-based polymer of claim 1, wherein the alcohol and the antioxidant are each independently injected in an amount of 0.0001 parts by weight to 1 part by weight based on 100 parts by weight of a total amount of the monomers.

8. The method for preparing a modified and conjugated diene-based polymer of claim 1, further comprising steam stripping of immersing a polymer obtained by the condensation reaction of the functional group derived from the modifier in the modified and conjugated diene-based polymer with the modification stabilizer of Formula 1 in water heated to 70° C. to 100° C. by steam, after the condensation reaction.

* * * * *